Aug. 28, 1973  J. GÜTLHUBER ET AL  3,755,528
METHOD FOR MAKING TUBULAR ARTICLES FROM
A THERMOPLASTIC MATERIAL
Filed Sept. 13, 1971
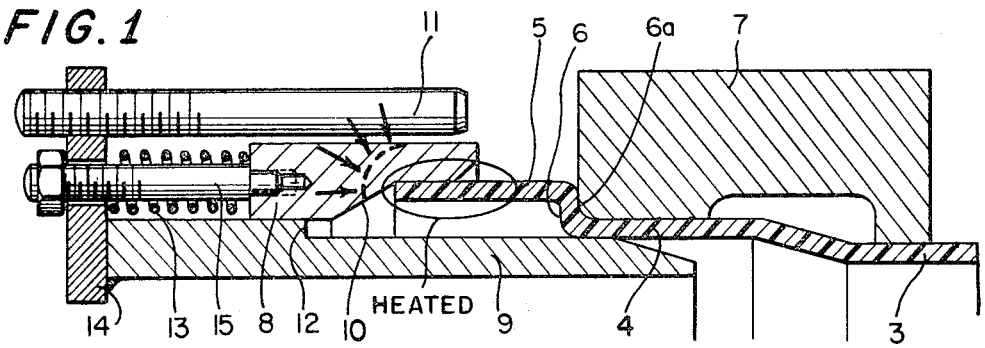
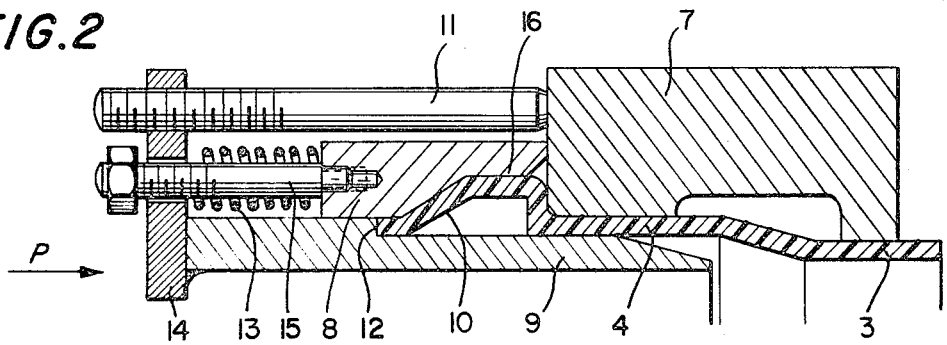
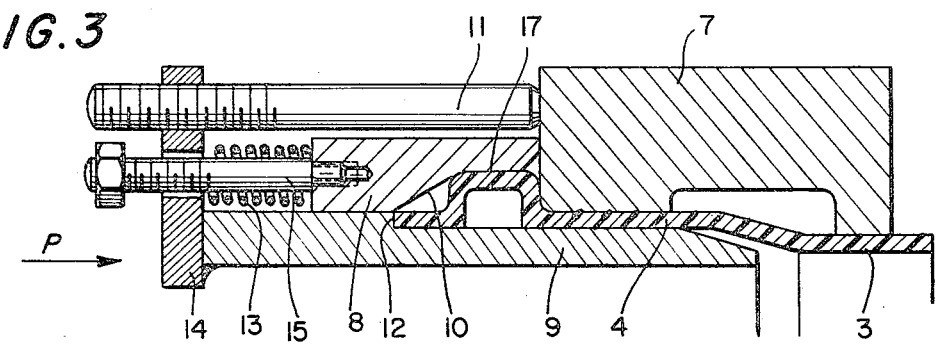
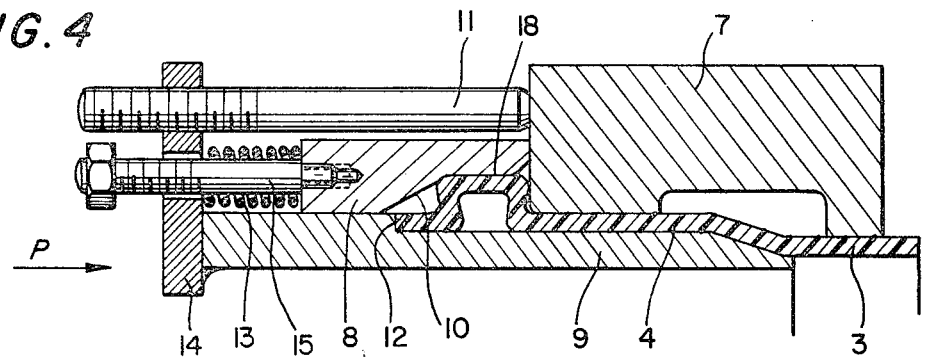
INVENTORS
JOHANN GUTLHUBER
ROBERT HEITZER
LUDWIG NEUEDER
Edmund M. Jaskiewicz
ATTORNEY United States Patent Office 3,755,528
Patented Aug. 28, 1973

3,755,528
METHOD FOR MAKING TUBULAR ARTICLES FROM A THERMOPLASTIC MATERIAL
Johann Gütlhuber, Irlbach, Robert Heitzer, Bogen, and Ludwig Neueder, Strasskirchen, Germany, assignors to Kunststoffwerk Gebruder Anger GmbH
Continuation-in-part of application Ser. No. 845,263, July 28, 1969. This application Sept. 13, 1971, Ser. No. 180,214
Int. Cl. B29b 3/00
U.S. Cl. 264—322
6 Claims

ABSTRACT OF THE DISCLOSURE

The end of a thermoplastic tubular article is molded to form a socket portion greater in diameter than the diameter of the tubular article and the end is enlarged to diameter greater than the socket portion with there being an annular shoulder between the socket and enlarged end portions. The enlarged end portion is heated to thermoelasticity and the outer edge of the enlarged end is drawn inwardly while the enlarged diameter end portion is restrained against outward radial movement and the socket portion restrained against both inward and outward radial movement. The extent of inward axial movement of the outer edge will determine the configuration of the annular corrugation formed in the enlarged end.

RELATED APPLICATION

The present application is a continuation-in-part of now abandoned application Ser. No. 845,263, filed July 28, 1969, by the same named inventors.

The present invention relates to the manufacturing of tubular articles of a thermoplastic material having an enlarged end with an annular corrugation therein, more particularly, to a process for forming the annular corrugation which will retain its shape and dimensional relationships when hot water over a wide range of temperatures flows therethrough.

In order to connect tubes, particularly those of a synthetic plastic material, one end of the tube is enlarged to form a socket which closely receives an end of the next succeeding tube. To insure tight connections between these tubes which are reliable over a long period of time the socket is generally provided with an annular corrugation within which is a packing ring. To further contribute to a reliable connection for a long period of time the tolerances between the mating ends of successive tubes must be as small as possible while at the same time as accurate as possible in order to provide a close fit between the mating ends.

Not only straight tubing but other tubular articles such as a wide variety of fittings including T's, connections, crossovers, curves of various angles and shapes, which have been molded into their original shape by a process such as injection molding can be subsequently reshaped. Such a reshaping may comprise forming a corrugation or an annular groove in a socket which has been previously formed in the end of the tubular article.

It has been proposed to mold a corrugated socket on the end of a tube of synthetic resin by introducing a fluid under pressure into the socket portion of the tube which has been heated to thermoplasticity and sealed to form a chamber therein. The fluid under pressure forces the material of the tube outwardly against an external mold. This outward expansion of the wall reduces the thickness of the wall and is compensated by initially forming the socket portion with an increased wall thickness. This procedure is disadvantageous in that the inner dimensions of the inner corrugated socket vary considerably since it is extremely difficult to obtain accuracy in the internal diameter of the socket end when it is necessary to initially form the socket end with increased wall thickness.

In order to eliminate the above mentioned disadvantage it has also been proposed to introduce an expansion mandrel into the socket end of the tube. One form of an expansion mandrel has a cylindrical shape and is provided with an annular rubber element which molds the annular corrugation by axially compressing the socket. Another form of expansion mandrel is constructed with a configuration corresponding to the cross section of the corrugation so that the diameter of the mandrel must be reduced to permit removal of the mandrel after the annular corrugation has been formed.

With respect to the above mentioned disadvantages only a limited success can be achieved with such structures for the mechanical molding of the socket end of a tube. Synthetic resins from which such tubes are generally constructed have a limited capacity for providing a close fit on the cylindrical portion of an expansion mandrel when a resin is contracted in the region of the annular corrugation. It is therefore necessary to frequently gauge and measure the socket with its annular corrugation to insure conformance to established tolerances.

There is a particularly great reduction of wall thickness in the vicinity of the annular corrugation so that when the socket is initially formed there must be increased wall thickness in this area of the socket. The socket corrugations must have cross sections which permit a ready withdrawal of the mandrel. It is not feasible to provide a back taper or undercut in the corrugation. When the tubes are produced by injection molding, the socket in the end of a tube is also formed by injection. When the corrugation is to be subsequently molded by compressed air or by internal mechanical molding devices the above statements still apply. The reduction of wall thickness in the area of corrugation requires an increased wall thickness when the socket is initially formed and the tolerances of wall thickness when the socket is initially formed and the tolerances of wall thickness result in corresponding deviations of the internal diameter of the corrugation. An accurate molding is particularly difficult in the transition area between the socket and the corrugation.

Tubular articles, such as indicated above, can be reshaped only in the range of the thermoelastic state of the material forming the tubular article if it is desired that such a reshaping be accurate and precise from the technical point of view. The thermoelastic range varies for different materials. For example, the thermoelastic range of olefins, such as polypropylene and polyethylene, is narrower than that of polyvinylchloride. In the case of polyvinylchloride, the transition from the range of the solid state to the range of the thermoelastic state is continuous or gradual while in the case of olefins this transition initially increases very slowly and at a certain temperature increases abruptly. If such a reshaping is carried out in the lower thermoelastic range greater forces are required. Further, the duration of time during which the reshaping forces must be applied also play a significant role. On the other hand, considerably less energy or force is required in the higher thermoelastic range.

For many applications of synthetic plastic tubular articles and fittings it is desired that these members be made of materials which readily tolerate higher temperatures without any tendency of the shaped article to return to its original condition at excessive temperatures. Further, if such restoring phenomenon should occur at excessive temperatures it is desirable that the sealing effect of the tubular article be unaffected. For example, it has been recently discovered that materials such as polypropylene and polyethylene have been particularly suitable for use as drain pipes. However, since many homes are being equipped with washing and dishwashing machines that discharge hot water, those thermoplastic materials previously used are no longer suitable for such drain or discharge pipes or parts thereof which are subjected to a varying temperature range of hot water. This is true to a considerably greater extent for industry and various commercial applications.

In order to reshape such tubular articles with forces that are readily available and not excessive the reshaping must occur in the upper range of the thermoelastic state of the material. However, in this temperature range the material is already so labile that it is virtually impossible to achieve accurate functional dimensions of the socket and corrugation or groove. When hot water at high temperatures is flowing through such tubular articles so that the temperature is reached at which the reshaping was performed, the restoring phenomenon of the material would cause the material to tend to be restored to its original shape which would result in leaks in the case of sockets and corrugations. In the extreme cases, the socket may even change shape so as to become oval in section.

In addition to the previously known processes for reshaping sockets formed in an end of a tubular article it has also been known to expand the end of a tubular article to a socket section and then to produce a corrugation or groove in this socket section by means of molding rings which are forced outwardly hydraulically or mechanically.

In all of the known processes for forming such an annular groove in a socket end either the socket end or the complete annular groove must be produced initially through a reshaping process. Such a process invariably adversely affects the dimensional relationships between the different portions of the tubular article. As described above, the thermal restoring effects are particularly disadvantageous when such tubular articles may be subjected to hot water at extremely high temperatures flowing therethrough.

It is therefore the principal object of the present invention to provide a novel and improved method and apparatus for forming an annular groove or corrugation in the socket end of a tubular article of thermoplastic material whose end has been previously molded to form the socket such that the inner shape and dimensional relationships of the groove retain its precise relationship over a wide range of temperatures encountered during operating conditions.

It is another object of the present invention to provide a method and apparatus for accurately and uniformly molding annular corrugations in such tubular articles.

It is a further object of the present invention to provide an apparatus and method for producing the optimum configuration of the annular corrugation for a particular intended application.

The present invention essentially discloses a process for manufacturing from a thermoplastic material a tubular article having a socket at one end with an annular groove which will retain its shape when hot water over a wide range of temperatures flows therethrough. According to one aspect of the present process there is formed a cylindrical socket having an enlarged diameter outer end and an annular shoulder in an end of a tubular article with the wall thickness of the socket and shoulder being uniform. The inner diameter of the enlarged diameter open end exceeds the inner diameter of the cylindrical socket by the inner height of the groove to be formed. That portion of the enlarged diameter outer end outwardly of the annular shoulder is heated to thermoelasticity. The heated outer end portion is then drawn in while in the thermoelastic state to reduce the diameter of the heated outer end to the diameter of the socket to mold a second annular shoulder spaced from the first annular shoulder to define an annular groove of uniform wall thickness. The inner diameter of the annular groove is equal to the inner diameter of the enlarged diameter outer end. Thus, the problem as set forth above is solved in a manner wherein a preformed tubular article has a socket end portion in which is formed a cylindrical section of large diameter for the end of the tubular article is reshaped by heating at least the forward portion of the larger diameter cylindrical section into the range of the thermoelastic state of the synthetic plastic material and by drawing in the heated forward end portion. The reshaping may occur through a simultaneous radial restraining or constriction. The preformed tubular article may have an annular shoulder between the socket section and the larger diameter end portion which may have angles of about 135° or 90° with respect to the socket and the outer end portion.

The present process has numerous distinct advantages over prior art processes. Since the essential part of the socket end and annular groove of the tubular article is already made in the original shape of the tubular article by an injection molding process the outer end portion of the socket end may be reshaped into the annular groove at the upper range of the thermoelastic state of the material. Accordingly, since that portion of the socket end and of the subsequently formed annular groove which are required to have a high degree of accuracy with respect to size will thus retain their original shape and their sealing effect even at high operating temperatures to which the tubular articles may be subjected. Moreover, that portion of the socket end which is reshaped into the annular groove is not stressed thermally under operating conditions to such a great extent because there is a temperature drop from the sealing ring inserted within the annular groove and an air cushion is present between the tube inserted in the socket end and the socket. Accordingly, the restoring phenomenon described above will not occur in this area. However, should this restoring effect occur in the event of excessive heating no adverse influence will be exerted on the sealing effect since that portion of the annular groove and socket that is mostly likely to be subjected to this excessive heating will remain in its original shape as determined by the initial injection molding process. It is recognized that these natural limits are defined by the properties of the materials employed.

A further advantage of the present process is that during the reshaping of the material the wall strength is not weakened nor is there any reduction in the thickness of the wall. Rather, a desirable strengthening of the wall is attained in this area of reshaping. Further, tubular articles of much greater wall thicknesses can be reshaped with the present process than with previously known processes.

A structure for molding such a socket having an annular corrugation may comprise a two-piece outer mold which has a cylindrical socket portion greater in diameter than the diameter of the mold. The mold is further provided with an enlarged cylindrical head portion adjoining the socket portion and having a greater diameter than the socket portion. A core is positionable within the mold and has a configuration conforming to the mold and spaced from the mold surfaces so as to define a space for a tubular molding. There is an annular shoulder in the outer mold between the socket portion and the enlarged head portion with said shoulder being at different angles to the socket portion and enlarged head portion surfaces depending upon the desired configuration of the corrugation.

There is also disclosed an apparatus for forming an annular corrugation in the end of a tubular article of a thermoplastic material with the end of the article having a socket and enlarged diameter end with an annular shoulder therebetween. The apparatus may comprise a restraining member or ring surrounding the socket portion of the tubular article and having a radial surface abutting the outer surface of the annular shoulder. There is an axially displaceable molding ring which is engageable with the outer surface of the forward portion of the enlarged diameter end. Within the molding ring there is an axially displaceable mandrel having a shoulder engageable with the outer edge of the enlarged diameter end. The molding ring restrains outward radial movement of the enlarged diameter end as the mandrel applies an axial force against the outer end of the enlarged diameter end so as to form the annular corrugation in the enlarged diameter end.

Other objects and advantages of the present invention will be apparent upon reference to the accompanying description when taken in conjunction with the following drawings, which are exemplary, wherein:

FIGS. 1-4 are longitudinal sectional views of a half of the molding apparatus of the present invention showing the moveable components thereof in different final positions at several stages of the process in forming annular corrugations of different configurations.

Proceeding next to the drawings wherein like reference symbols indicate the same parts throughout the various views of a specific embodiment and modifications of the present invention will be described in detail.

A divided or two-piece die is used for forming the socket end of a tubular article made of a thermoplastic material such as a synthetic resin. To shape the socket end of a pipe, a core is introduced into the mold with the configuration of the core conforming to the configuration of the die but having its surfaces spaced therefrom so as to form a chamber or cavity within which the socket end of the tube is shaped. A tube of thermoplastic material is indicated at 3 and is shaped within the die to have a cylindrical socket portion 4 which is of slightly greater diameter than the diameter of the tube 3 as shown in FIG. 1. The outer end of the tube is shaped to form a cylindrical enlarged head end 5 having a greater diameter than the diameter of the socket portion 4. The inner diameter of the head end portion 5 will exceed the inner diameter of the socket portion 4 by the height of the inner cross section of the corrugation to be formed in the socket end of the tube.

The enlarged end portion 5 is connected to the socket portion 4 by an annular shoulder 6 which is essentially steplike in nature and preferably provided with rounded edges as may be seen in FIG. 1. In FIG. 1 the annular shoulder 6 is perpendicular to the central longitudinal axis of the tube and hence forms an angle of 90° with each of the enlarged end portion 5 and the socket portion 4. It is preferable that the die 1 be made to shape the annular shoulder in this manner where the intended corrugation is to be provided with a relatively steep rear surface 6a.

The details of the configuration of the die, particularly the transition area between the socket portion 4 and enlarged head end 5, may be modified depending upon the desired cross section of the annular corrugation. The rear surface 6a of the angular corrugation is preformed by the interaction of the die and core. This rear face is determined by the annular shoulder 6 which enables a precise and accurate formation of the upper and lower supporting surfaces of the packing ring to be received in the corrugation and the intermediate transition areas in the finished corrugation. If the corrugation is to have the sloping rear surface which is relatively flat the shoulder 6 may then define an angle of about 135° with each of the adjacent cylindrical portions 4 and 5. The shoulder 6 may also be radial so as to form an angle of approximately 90° with the adjacent cylindrical portions and may even be sloped rearwardly so as to have a back taper or undercut as will be subsequently described. In order to prevent a squeezing of the packing ring from its seat within the annular corrugation the transition of the steplike shoulder 6 into the cylindrical socket portion 4 should preferably have a small radius of curvature which may be merely a rounded edge as may be seen in the drawings.

The process and apparatus for molding of the socket end of the tube to form the annular corrugation is illustrated in FIGS. 1-4. The apparatus comprises an angular restraining member 7 a portion of which embraces the outer surface of the socket portion 4 of the tube and also provides a support for the outer surface of the annular shoulder 6. An axially displaceable molding ring 8 has a sloping surface 10 which is engageable with the enlarged portion of the socket end. There is an inner mandrel 9 which is also axially displaceable with the molding ring 8 and has an outer diameter substantially equal to the inner diameter of the socket portion 4 of the tube. The mandrel 9, which is cooled, has an external shoulder 12 which engages the outer edge of the enlarged end as may be seen in the drawings. The mandrel 9 is welded to a pressure plate 14 within which is threaded a stop pin 11 whose end is engageable with the restraining member 7.

The molding ring 8 is resiliently mounted on the pressure plate 14 by means of spring guide pins 15 which are surrounded by compression springs 13 acting between the pressure plate and the mold ring. The forces exerted by the compression springs 13 are greater than the force required for deforming the enlarged end portion 5 of the tube end.

In FIG. 2 the tube is illustrated as having an annular corrugation 16 formed in its socket end with the shape of this corrugation being only one of several possible configurations. In order to form this annular corrugation according to the invention the end of a synthetic resin plastic tube 3 is first molded to form the socket end as shown in FIG. 1. The socket end is then positioned in a restraining ring 7 as shown in FIG. 2 and the outer enlarged end portion 5 is then heated by suitable means to thermoelasticity. The molding ring 8 and the cooled inner mandrel 9 are then moved axially against the enlarged end 5. The sloping surface 10 of the molding ring will force the end portion forwardly and the forward edge will be engaged by the shoulder 12 in the inner mandrel 9. The depth of axial penetration of the mandrel 9 will be determined by the adjustment of the stop pin 11 within the pressure plate 14. As shown in FIG. 2 the stop pin 11 has been adjusted to halt the penetration of the mandrel 9 in the position shown in FIG. 2 so that the forward face of corrugation 16 is sloping and conforms to the sloping surface 10 of the molding ring 8.

In FIG. 3 the stop pin 11 has been adjusted to permit a further axial penetration of the mandrel with the result that the shoulder 12 of the mandrel will continue to compress axially the front edge of the tube until an annular corrugation 17 is formed which has substantially rectangular cross section.

If the stop pin 11 is adjusted to permit still further axial penetration by the mandrel the result will be the annular corrugation 18 as shown in FIG. 4. In this adjustment of the molding apparatus the shoulder 12 will continue to compress axially the forward edge of the tube to form the corrugation as shown in FIG. 4. The corrugation 18 of FIG. 4 is described as having a back taper. It is thus apparent that the corrugation with steep faces such as in FIG. 3 or with a back taper such as in FIG. 4 is formed by axially compressing the forward end of the tube in addition to a restraining or constricting of the enlarged end portion 5. As a result, it is possible to have very steep transitions between the socket portion 5 and the corrugation without any change in the wall thickness of the portions of the tube end which are being worked. Further, since the internal and the external diameters of the end of the tube correspond to the diameters of the finished corrugation the diameters of the corrugation can be formed within very narrow manufacturing tolerances.

It is pointed out that the molding ring 8 with its sloping surface 10 is particularly suitable for forming an annular corrugation having a sloping forward surface such as the corrugation 16 in FIG. 2. However, the same molding ring with its sloping surface may also be used for molding corrugations with vertical front surfaces such as in FIG. 3 or for corrugations with back tapes such as in FIG. 4 if the maximum depth of penetration of the mandrel 9 is adjusted by means of the stop pin.

The annular corrugations and socket ends produced in accordance with the present invention have very narrow tolerances which is a particular advantage for inserted bonded socket joints since the gap required for adhesive bonding can be maintained extremely accurately. Further, since the thickness or mass and cross section configuration of the corrugations can be maintained precisely the crushing of rubber packing elements and squeezing of sealing elements from the corrugations during the assembly process can be avoided.

Another advantage of the present invention is that there is no reduction of wall thickness in the vicinity of the annular groove during the forming process. Therefore it is not necessary to form initially the socket with an increased wall thickness. It is known that when it is necessary to increase the wall thickness in the socket in order to form an annular groove therein it is extremely difficult to achieve accurate molding in the transition area between the socket and the groove. It is also difficult to avoid deviations in the internal diameter of the groove when it is necessary to reduce the wall thickness. The present process eliminates these problems resulting from a reduction of wall thickness by enabling the socket and annular groove therein to be formed of a uniform wall thickness without the necessity of initially increasing the wall thickness of the wall socket in the vicinity of the annular groove. The formation of an annular groove is therefore more accurate and less costly than previous processes where it is necessary to make complicated calculations in order to determine the amount by which the wall thickness of the socket should be initially increased in order that the resulting thickness of the annular groove is of the desired dimensions.

It is pointed out that the inner diameter of the enlarged diameter open end exceeds the inner diameter of the cylindrical socket portion by the inner height of the annular groove to be formed. This dimension will remain constant throughout the forming operation and the height of the annular groove or corrugation will be the same after the forming operation has been completed. Only the outer end of the enlarged diameter portion, namely that portion outwardly of the annular shoulder, is heated to thermoelasticity. This heated outer end is then drawn inwardly while in the thermoelastic state to mold the annular groove therein. Thus, only that portion of the outer end is heated which will form the forward shoulder of the annular groove and the end portion extending outwardly thereof. Since the entire enlarged open end is not heated the dimension of the rearward portion of the enlarged end and the adjacent annular shoulder will remain constant and will not be affected by the forming operation.

It is understood that this invention is susceptible to modification in order to adapt it to different usages and conditions and, accordingly, it is desired to comprehend such modifications within the invention as may fall within the scope of the appended claims.

What is claimed is:

1. In a process for manufacturing from a thermoplastic material a tubular article having a socket at one end with an annular groove which will retain its shape when hot water over a wide range of temperatures flows therethrough, the steps of forming a cylindrical socket having an enlarged diameter outer end and an annular shoulder in an end of a tubular article with the wall thickness of said socket and shoulder being uniform, the inner diameter of the enlarged diameter open end exceeding the inner diameter of the cylindrical socket by the inner height of the groove to be formed, heating that portion of the enlarged diameter outer end outwardly of the annular shoulder to thermoelasticity, and reducing the diameter of the heated outer end while in the thermoelastic state to the diameter of the socket to form a second annular shoulder spaced from the first annular shoulder to define an annular groove of uniform wall thickness, the inner diameter of the annular groove being equal to the inner diameter of the enlarged diameter outer end.

2. In a process as claimed in claim 1 wherein the outer edges of said heated end is compressed axially and urged radially inwardly.

3. In a process as claimed in claim 1 wherein the annular shoulder defines an angle of 90 degrees with each of the socket portion and the enlarged diameter end portion surfaces.

4. In a process as claimed in claim 1 wherein the annular shoulder defines an angle of about 135 degrees with each of the socket portion and the enlarged diameter end portion surfaces.

5. In a process as claimed in claim 1 wherein the transitions of the annular shoulder have small radii of curvature.

6. In a process as claimed in claim 2 wherein the axial compressing and inward radial urging is continued until the corrugation is provided with a forward wall spaced from and substantially parallel to the annular shoulder.

References Cited

UNITED STATES PATENTS 3,445,552   5/1969   Aungst et al. -------- 264—322

FOREIGN PATENTS 1,215,883   4/1960   France ------------ 264—320

DONALD J. ARNOLD, Primary Examiner

T. E. BALHOFF, Assistant Examiner

U.S. Cl. X.R.

264—323